United States Patent
Walz et al.

[11] 4,001,357
[45] Jan. 4, 1977

[54] PROCESS FOR THE MANUFACTURE OF FIBERS FROM FUSIBLE MATERIALS

[75] Inventors: Alfred H. Walz, Emmendingen; Paul-Jürgen Hahn, Karlsruhe-Durlach, both of Germany

[73] Assignee: Alfred Walz, Emmendingen, Germany

[22] Filed: Aug. 1, 1973

[21] Appl. No.: 384,565

[30] Foreign Application Priority Data

Aug. 2, 1972 Germany .......................... 2237884

[52] U.S. Cl. .................................. 264/12; 264/14; 264/176 F; 264/121; 264/237
[51] Int. Cl.² .................................. B22D 23/08
[58] Field of Search ............. 65/5, 7; 264/DIG. 75, 264/210 F, 12, 176 F, 115, 14, 121, 237; 425/72 S

[56] References Cited
UNITED STATES PATENTS

| | | | |
|---|---|---|---|
| 2,221,011 | 11/1940 | Vieweg et al. ............................. | 65/5 |
| 2,331,944 | 10/1943 | Pazsiczky et al. .................. | 8/115.5 |
| 2,411,660 | 11/1946 | Manning ............................. | 264/171 |
| 2,635,389 | 4/1953 | Toulmin .................................. | 65/8 |
| 3,015,127 | 1/1962 | Stalego ....................... | 264/DIG. 75 |
| 3,346,356 | 10/1967 | Anderson et al. .................... | 264/12 |
| 3,436,792 | 4/1969 | Hench ............................. | 264/176 F |
| 3,502,763 | 3/1970 | Hartmann ...................... | 264/210 F |
| 3,613,158 | 10/1971 | Mottern et al. ................ | 264/176 F |
| 3,692,618 | 9/1972 | Durschner et al. ................. | 156/181 |
| 3,707,593 | 12/1972 | Fukada et al. .................. | 264/210 F |
| 3,725,021 | 4/1973 | Trout et al. .............................. | 65/5 |
| 3,773,483 | 11/1973 | Schmidt ........................ | 264/176 F |
| 3,787,195 | 1/1974 | Kirchheim ...................... | 264/176 F |
| 3,806,289 | 4/1974 | Schwarz ............................ | 264/115 |
| 3,811,850 | 5/1974 | Dobo ........................................ | 65/1 |

FOREIGN PATENTS OR APPLICATIONS

43-22333  9/1968  Japan ............................. 264/176 F

*Primary Examiner* — Jay H. Woo
*Attorney, Agent, or Firm* — Browdy and Neimark

[57] ABSTRACT

A process and apparatus for the manufacture of fibers from fusible materials and particularly materials of low viscosity. The melt and gaseous flow medium is passed through a Laval-nozzle at a supersonic speed. The nozzle and speed are so selected as to cause an abrupt temperature drop in the flow medium within the nozzle which causes the melt to solidify into fibers.

8 Claims, 3 Drawing Figures

PROCESS FOR THE MANUFACTURE OF FIBERS FROM FUSIBLE MATERIALS

The present invention relates to a process for the manufacture of fibers from fusible materials and, more particularly, fibers from inorganic, for instance metallic, from mineral or from organic substances. The initial substance is melted in a heated crucible and a preferably low-viscosity melt issues from at least one opening in the bottom of the crucible. The melt is separated into fibers by means of a gaseous medium in an associated channel (Laval-nozzle) preferably symmetric with respect to rotation and generating supersonic flow, where it solidifies.

The invention further relates to a device for the manufacture of fibers from fusible materials of the kind initially described including a heatable crucible with at least one orifice in the bottom thereof, at least one channel (Laval-nozzle) generating supersonic flow and located underneath the crucible bottom orifice, and means for supplying and feeding a gaseous medium.

The invention further relates to a device for generating supersonic flow.

The generation of fibers of finite length from high temperature inorganic melts in accordance with the prior art nozzle blowing process (W. German Pat. No. 1,190,135) will only succeed if the melts are sufficiently viscous or if they are provided with a sufficiently large ratio of viscosity to surface tension.

Melts of inorganic, for instance metallic substances, wherein the ratio of viscosity to surface tension is only very small — this as a rule being equivalent to a very narrow temperature range, i.e., with a defined melting point — essentially will be pulverized when making use of the known nozzle blowing process. The end product solidified during the cooling of the process essentially is in the shape of spheres as opposed to the desired fibers.

Two intermediate phases may be observed for sufficiently high temperature levels between the location of the melt exit, for instance the bottom orifice of an iridium or molybdenum crucible, in an ambience of protective gas, and the location of the occurrence of the solidified spherical end-product, namely:

1. a melt (liquid) film;
2. fiber-like, but nevertheless liquid, formations which on account of hydrodynamic instability ultimately will, under the influence of surface tension, divide into a large number of droplets.

The present invention addresses the task of avoiding droplet formation.

This problem essentially is solved by the present invention in so selecting the speed in a channel (Laval-nozzle) generating supersonic flow in flow direction $x$ that supersonic speed will be obtained after the narrowest location and that a temperature drop of the flow medium occurs at a given path segment $\Delta x$ within a short time interval $$\Delta t = \Delta x / U_{mean}$$

and that the melt medium in the fiber state is thereby made to solidify.

Therefore, the temperature of the flow medium surrounding the fiber-like structures and carrying them along will be lowered during the fiber-phase, that is, prior to decomposition into droplets, and more or less abruptly, i.e., in a sufficiently short time to below the melting temperature, and thus the previously liquid medium will solidify in fiber-form. The state of the fiber following solidification may be amorphous or polycrystalline depending on the kind of the medium and the nature of the temperature drop. As a rule, the polycrystalline state will be preferable on account of likely higher material strength characteristics.

In order to generate supersonic speed, the pressure ratio of the pressure at inlet location $P_1$ to that at the outlet location $P_3$ of the Laval-nozzle is selected as smaller than the critical value of 0.53.

According to an advantageous structure, to accomplish the process of the present invention, the pressure ratio for the generation of supersonic flow is caused by an injector, which, in turn, is operated by supersonic flow, of a drive medium supplied at its outer periphery and of sufficiently high pressure and flow rate.

When making the crucibles of base metals such as molybdenum, the flow gas advantageously will be an inert protective gas of 80 – 98% $N_2$ with the remainder $H_2$. An inert protective gas also advantageously serves as drive medium for the injector and, if necessary, may be recovered in closed loop operation. When making the crucibles of noble metals, compressed air may be used as the drive medium for the injector.

A Laval-nozzle, known per se, is particularly suitable as a flow device meeting the requirement of an optimum nozzle blow process as well as that of the invention in a short time following temperature shock.

If a pressure ratio $p_3/p_1$ of about 0.53 is set with respect to the pressure $p_1$ at the inlet side where the velocity, $U_1 = 0$ and where the medium to be separated in fibers is still being carried in liquid, single thread form, and to the pressure $p_3$ at the outlet side, then the speed of flow $U_2$ at the narrowest location 2 will be exactly equal to the speed of sound a.

The temperature ratio, with $k = 1.4$ for air:
$$T_2/T_1 = (p_2/p_1)^{(k-1)/k} = (p_2/p_1)^{0.286} = 0.83$$

The flow medium may be brought to supersonic speed behind this most narrow location if 1. the pressure ratio $p_3/p_1$ is less than 0.53 and
2. the cross-section of the Laval-nozzle behind this most narrow location will again be enlarged. As is known, U will always remain equal to a at the most narrow location, regardless of how small a value of $p_3/p_1$ is being selected.

The cross-section $F(x)$ behind the most narrow location of the Laval-nozzle in accordance with the known laws of gas dynamics determines the speed U, the pressure $p$ and — in accordance with the laws of thermodynamics — also the temperature T. One obtains, therefore, the temperature ratio $T(x)/T_2$ as the following relation:

$$F(x)/F_2 = f[U(x)/a] = f(m(x))$$

wherein $M$ - local Mach number, $M - U/a$.

In particular, when $k - 1.4$ for air,
$$T(x)/T_1 = [p(x)/p_1]^{0.286}$$

By means of a functional cross-section $F(x)$ fitted to the temperature, one may achieve a temperature drop of the blowing medium along a predetermined short segment $\Delta x$ and within an associated short time $$\Delta t = \Delta x / U_{mean} \approx 2 \Delta x / (U_2 + U_3)$$

The thread temperature follows the temperature of the flow medium with a certain time lag because there must be heat transfer between the two media. For the very small thread diameters (of the order of a micron) being considered, the thread surface may be considered very large compared to the volume and the time lag may be considered negligibly small.

Two examples of execution of the process of the present invention will be discussed in greater detail:

FIRST EXAMPLE: ROCKWOOL.

The raw material was of the following composition:

| | | | |
|---|---|---|---|
| $SiO_2$ | 51.7% | CaO | 29.9% |
| $Al_2O_3$ | 8.0% | MgO | 4.0% |
| $Fe_2O_3$ + FeO | 3.3% | $Na_2O$ + $K_2O$ | 3% |
| $TiO_2$ | 0.6% | $SO_3$ | 0.2% |

The thermoplastic range extends from about 800 to about 1,450° C.

The melting temperature in the Pt-Rh crucible (80–20 = 80% Pt, 20% Rh) ranges from about 1,350° to 1,450° C.

A fiber product is produced with a fiber diameter of about 0.5 to 3 × $10^{-3}$ mm and of a length of about 5 to 20 mm.

The quantity produced amounted to about 15 to 30 grams per crucible bottom orifice (about 1.4 mm in diameter) per minute.

The viscosity was:
$$\mu(\theta) : \log_{10}(\log_{10}\mu) \approx 0.630 - 3.23 \log_{10}(\theta 10 - 1000)$$
wherein $\theta$ in ° C. and $\mu$ in poises.

The table below lists the pressures, speeds and temperatures at the individual locations of the device.

TABLE I

| LOCATION (see FIGS. 1 & 2) | 1 | 2 | 3 | 3' | 4 | 4' | 15 |
|---|---|---|---|---|---|---|---|
| $kg^p/cm^2$ (atm) | 1.0 | 0.528 | 0.300 | 0.200 | 6.0 | P4'/P4 = 0.15 | ca 1.0 |
| U m/s | 0 | 340 | 412 | 472 | 0 | — | few m/s |
| M = U/a | 0 | 1.0 | 1.4 | 1.7 | 0 | 1.9 | ~0 |
| T ° K | 300 | 249 | 215 | 189 | 300 | — | 300 |

$\Delta x = x_3 - x_2 = 5$ mm = length of the path of appreciable separation into fibers (selected)
$\Delta t = 2 x/(U_2+U_3) = 5 \times 10^{-3}/376 = 1.33 \times 10^{-6}$ = seconds (time of separation into fibers)
$\Delta T = T_2-T_3 = 34°$ C. = temperature (slight for rockwool on account of large thermoplastic temperature range, see above)

SECOND EXAMPLE (KAOWOOL)

The raw material was of the following composition:
$SiO_2 = 50\%$
$Al_2O_3 = 50\%$ The thermoplastic range extends from 1750 to 1,800° C. The melting temperature is an iridium crucible (100% iridium) was about 1,800° C.

The following fiber products were obtained:
  about 0.5 to 3.0 × $10^{-3}$ mm. in diameter (thread diameter)
  about 2 to 10 mm in length.

Thus, there were practically no non-fiberlike residues (beads). The amount produced was about 7 to 10 grams per bottom orifice of crucible (about 0.9 mm in diameter) per minute. The viscosity is not known from the literature but it is considerably lower than for rockwool in the temperature range where separation into fibers is feasible. The supersonic speed is indispensable in the range of 3,3'.

Table II below shows the pressures, speeds and temperatures at the diverse locations:

TABLE II

| Location See FIGS. 1 & 2 | 1 | 2 | 3 | 3' | 4 | 4' | 15 |
|---|---|---|---|---|---|---|---|
| $kg^p/cm^2$ (atm) | 1.0 | 0.528 | 0.20 | 0.15 | 6 | P4'/P4 = 0.10 | 1 |
| U m/s | 0 | 340 | 472 | 502 | 0 | — | few m/s |
| T ° K | 300 | 249 | 189 | 174 | 300 | — | 300 |
| M = U/a | | 1.0 | 1.7 | 1.9 | 0 | 2.2 | ~0 |

$\Delta x = x_3 - x_2$ 5 mm = length (selected) over which there is appreciable separation into fibers.
$\Delta t = x/(U_2+U_3)/2 = 5 \times 10^{-3}/506 \approx 1.23 \times 10^{-6}$ seconds (time for separating into fibers)
$\Delta T = T_2-T_3 = 60°$ C. = temperature drop (shock) – (appreciable for kaolin on account of narrow thermoplastic temperature range, see above).

The invention also relates to a device for the manufacture of fibers from fusible materials, in particular fibers from inorganic materials such as metallic ones, from mineral substances or organic substances, where the device is provided with a heatable crucible with at least one orifice in the bottom of that crucible, with at least one channel (Laval-nozzle) below the crucible bottom orifice and generating a supersonic flow, and with means for supplying a gaseous medium.

The invention is characterized in that the cross-section of the Laval-nozzle in the x-flow direction is so chosen that a temperature drop of the blowing medium along a predetermined path segment $\Delta x$ behind the most narrow location is achieved within an associated short physical time interval $\Delta t$,
$$\Delta t = \Delta x/U_{mean}$$
which causes the melt medium being carried along in the fiber state to solidify.

By varying the temperature $T_1$ of the flow medium entering the Laval-nozzle (for instance air or inert gas), optimum adaptation of the material to be separated into fibers to the temperature-dependence of the viscosity may be obtained by means of a further advantage of the invention.

Advantageously, the heatable crucible consists of coaxial cylindrical walls provided at their upper ends with current feeds and their lower ends being conductively interconnected, the material to be melted being introduced in the annular space between the inner and outer cylindrical walls. The crucible appropriately is made of noble metals or from alloys of noble metals (iridium, platinum, rhodium) with sufficiently high melting points.

Advantageously several melt outlet orifices are provided in the crucible bottom, preferably in a circle or a polygon, each being provided with its own Laval-nozzle.

Crucibles of the kind described are discussed, for instance, in German Patent Nos. 1,293,309; 1,293,972; and 1,293,973.

The drawings show embodiments of the invention, without thereby restricting the latter to the illustrations shown.

Figure 1:
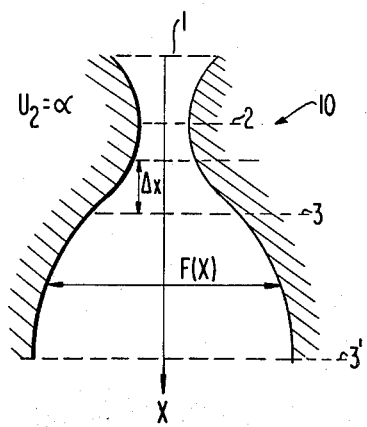
FIG. 1 is a schematic representation of a Laval-nozzle of the invention.

The inlet orifice in the x-direction of a Laval-nozzle 10 is denoted by 1 in FIG. 1, the location of the most narrow cross-section is referenced by 2, the range of the temperature drop by 3 and the outlet orifice by 3'. The function of the cross-section by means of which the temperature shock may be achieved is denoted by $F(x)$.

Figure 2:
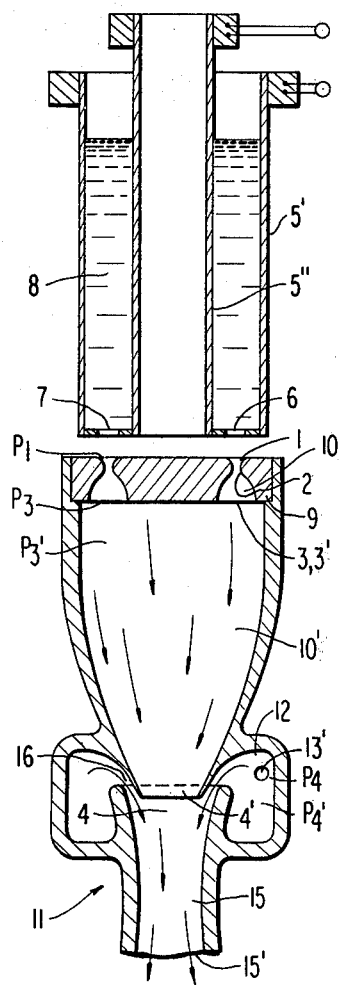
FIG. 2 shows schematically a device for the manufacture of fibers by means of a Laval-nozzle of the invention and with an injector connected thereto.

In the embodiment shown in FIG. 2, melting occurs by means of directly heating a noble metal crucible consisting of coaxial cylinders 5' and 5" and of a crucible bottom 6. The ohmic heat of the coaxial cylinder walls 5' and 5" traversed by electrical current and of the crucible bottom 6 provided with melt outlet orifices 7 is supplied to melt-material 8. The latter may be a ceramic substance in the embodiment shown.

A nozzle plate 9 is mounted at a spacing from and below the melt outlet orifices 7, each of which is associated with a Laval-nozzle in the nozzle plate 9.

Figure 3:
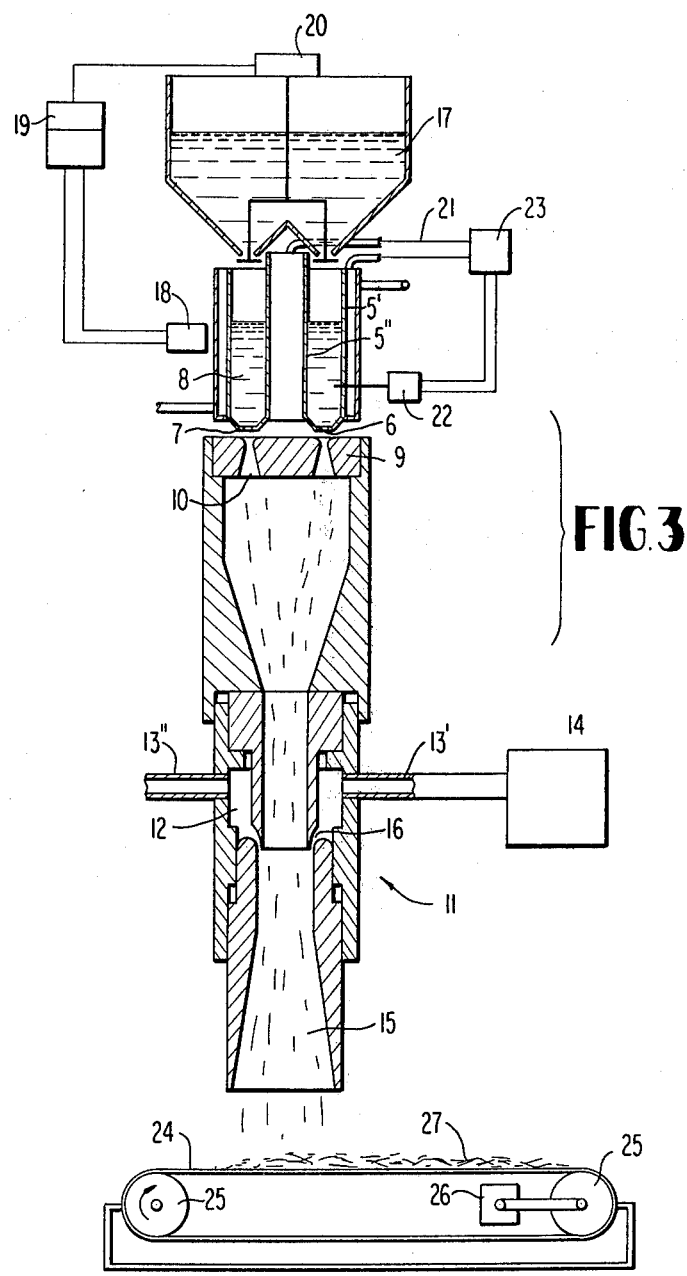
FIG. 3 is partly schematic and shows a complete device for the manufacture of fibers in accordance with the invention.

Nozzle plate 9 is the upper closure of an evacuation chamber 10' operating in concert with an injector 11 which is provided with an annular chamber 12 into which lead drive medium conduits 13' and 13" supplying a pressure medium such as compressed air from a compressed air source 14 (FIG. 3). Injector 11 is equipped with a Laval-nozzle 16 shaped similar to an annular slit.

The melt jet is sucked through the Laval-nozzles of the invention, which are symmetric with respect to rotation, and in the process are markedly accelerated. After passing through the phase of a fiber bundle or melt film, the state of the fiber will be frozen by means of the temperature shock of the invention.

Generation of an under-pressure $p_3'$ in an under-pressure chamber 10' common to all individual Laval-nozzles 10 in FIG. 1 is obtained by means of the supersonic injector 11.

Again, with $k = 1.4$ for air,
$$T_3/T_1 = (p_3/p_1)^{0.286} \text{ and } T_3'/T_1 = (p_3'/p_1)^{0.286}$$

Pressure $p_4'$ will be equal to or less than $p_3'$ in the range of supersonic decrease 4' between the drive medium and the medium evacuated from the individual Laval-nozzles 10. To that end, the Laval-nozzle 16 shaped nearly like an annular slot in accordance with the invention will be such as regards cross-section that it will correspond to the same gas dynamic relations known per se that $p_4'$ will be less than $p_3'$. Furthermore, the pressure of the drive medium $p_4$ will be selected of such high value that the energy losses will be covered in mixing zone 4'.

For a pressure $p_4 = 6$ atm $= 6$ kg/cm$^2$, a Mach number of about 1.7 may be achieved at location 3'.

A subsequent subsonic diffuser 15 by means of conventional cross-sectional enlargement allows appreciable recovery of kinetic flow energy, so that the drive pressure $p_4$ to be applied remains relatively low and hence the overall efficiency of the device of the invention becomes very advantageous. By means of sufficient length and enlargement of the cross-section in accordance with the known laws of flow mechanics, one may raise $p_{15}'$ at the outlet of diffuser 15 to about atmospheric pressure $p_1$ (see U.S. Pat. No. 3,283,039 or Austrian Pat. No. 249,850).

A complete facility for the execution of the process is shown in FIG. 3. The same parts are referenced by the same numerals. The material being supplied in fluid or trickling but preferably not powdery form to the crucible is collected in a supply container or feeding funnel 17. The filled level of the crucible is constantly monitored by means of a level sensor 18 and a level regulator 19 actuating a metering device 20. A current regulator 23 controls the current supply via the supply lines 21 by means of a temperature monitor 22 and in such manner that the melt material at the bottom of the crucible is kept fluid enough to prevent clogging of the melt outlet orifices. For the embodiment shown, twenty melt outlet orifices 7 symmetric with respect to rotation are provided in the crucible bottom 6, and twenty corresponding Laval-nozzles 10 of the invention are mounted in a similar array in the nozzle plate 9.

The drive medium supply to the annular-slot shaped Laval-nozzle 16 or to the annular chamber 12 of injector 11 occurs from the compressed air source 14 via supply lines 13' and 13". A conveyor device consisting of a punched conveyor belt 24 moving in the direction of the arrow over rollers 25 is provided underneath subsonic diffuser 15. The drive is provided by a drive motor, preferably an electrical motor 26. The fibers manufactured in accordance with the invention's process fall from the lower end of subsonic diffuser 15 upon conveyor belt 24 and thereupon form a web 27 which may further be processed in known manner.

One may also operate the entire facility in an atmosphere of inert, protecting gas, for instance in order to make use of molybdenum as an economical, base crucible metal nevertheless of a high melting point. Devices in such cases have to be provided with means by which the produced fibers or webs may be removed in synchronism.

It will be obvious to those skilled in the art that various changes may be made without departing from the scope of the invention and the invention is not to be considered limited to what is shown in the drawings and described in the specification.

What is claimed is:

1. A method for the manufacture of fine fibers from fusible low-viscosity melts of inorganic, mineral or metal materials or organic materials, comprising:
    heating the starting material to a temperature above the melting point thereof;
    causing said melt to pass through an orifice means into a Laval-nozzle;
    causing a pressure drop across the Laval-nozzle of a magnitude sufficient to bring a flow medium, which carries said melt, passing through the nozzle to supersonic speed therewithin; and causing the temperature of the flow medium to drop abruptly in a sufficiently short distance within the Laval-nozzle to solidify the melt into the form of fibers before the surface tension of the melt forms the melt into droplets, by selecting an appropriate configuration of said Laval-nozzle.

2. A process in accordance with claim 1 wherein the pressure ratio of said gaseous flow medium of the pressure at the inlet to said Laval-nozzle to the pressure at the outlet thereof is less than 0.53.

3. A process in accordance with claim 1 wherein said step of causing the gaseous flow medium to pass through a Laval-nozzle at a supersonic speed is accomplished by disposing an injector chamber downstream of said Laval-nozzle and directing a drive medium to enter said injector chamber at supersonic speeds and flowing in the same direction as said flow medium and melt to create a negative pressure at the outlet of said Laval-nozzle.

4. A process in accordance with claim 1 wherein said flow medium is an inert protective gas of 80–98% $N_2$ and the remainder $H_2$.

5. A process in accordance with claim 3 wherein said heating step is accomplished in a crucible made of a noble metal and said driving medium is compressed air.

6. A process in accordance with claim 3 wherein said driving medium is an inert protective gas.

7. A process in accordance with claim 6 further comprising the step of recirculating said driving medium.

8. A process in accordance with claim 1 further including the step of setting the temperature of said flow medium entering the Laval-nozzle at a predetermined value depending upon the temperature-dependence of the viscosity of the starting material.

* * * * *

UNITED STATES PATENT AND TRADEMARK OFFICE
CERTIFICATE OF CORRECTION

PATENT NO. : 4,001,357
DATED : January 4, 1977
INVENTOR(S) : Alfred H. Walz et al.

It is certified that error appears in the above-identified patent and that said Letters Patent are hereby corrected as shown below:

Column 3, line 37, that portion of the equation reading

"($\theta$10 -" should read --($\theta$- --

Signed and Sealed this

Twenty-first Day of June 1977

[SEAL]

Attest:

RUTH C. MASON
*Attesting Officer*

C. MARSHALL DANN
*Commissioner of Patents and Trademarks*